United States Patent [19]

Williams

[11] 4,342,921
[45] Aug. 3, 1982

[54] LOCOMOTIVE ENERGY RECOVERY SYSTEM

[76] Inventor: Thomas J. Williams, 1860 N. El Molino, Pasadena, Calif. 91104

[21] Appl. No.: 262,434

[22] Filed: May 11, 1981

[51] Int. Cl.³ .............................................. B60L 1/02
[52] U.S. Cl. .......................................... 290/2; 290/3
[58] Field of Search ........................................ 290/2, 3

[56] References Cited

U.S. PATENT DOCUMENTS

| | | | |
|---|---|---|---|
| 423,421 | 3/1890 | Farrall | 290/3 |
| 1,866,544 | 7/1932 | Cleaver. | |
| 2,558,648 | 6/1951 | Gausmann. | |
| 3,079,509 | 2/1963 | Adamek | 290/3 |
| 3,228,466 | 1/1966 | Carleton. | |
| 3,280,301 | 10/1966 | Anderson et al.. | |
| 3,685,458 | 8/1972 | Price et al.. | |
| 4,264,826 | 4/1981 | Ullman | 290/2 |

Primary Examiner—J. V. Truhe
Assistant Examiner—Shelley Wade
Attorney, Agent, or Firm—Herman J. Hohauser

[57] ABSTRACT

An energy recovery system for a diesel electric locomotive is disclosed. The energy recovery system captures and stores the waste heat generated by the diesel engine of the diesel electric locomotive for use at a remote location at a later time. The energy recovery system also converts the electricity generated by the diesel electric locomotive during dynamic braking into heat, and captures and stores this heat for use at a remote location at a later time.

9 Claims, 4 Drawing Figures

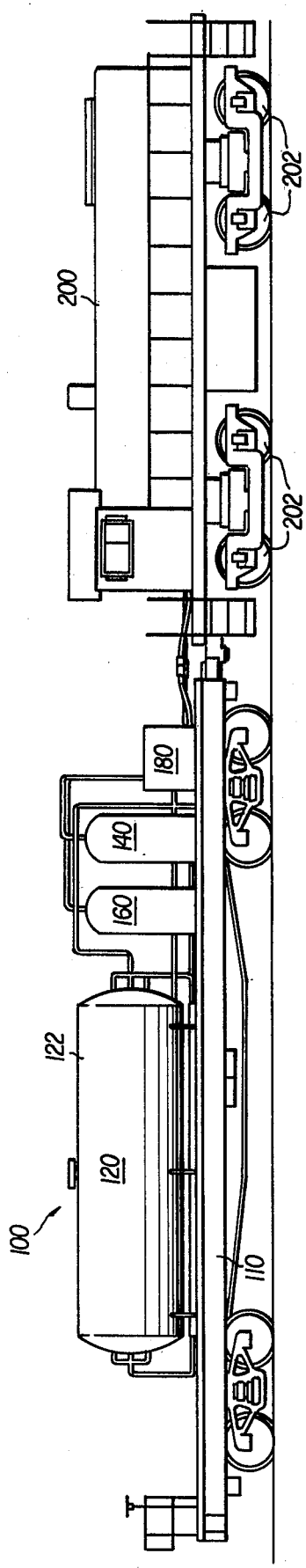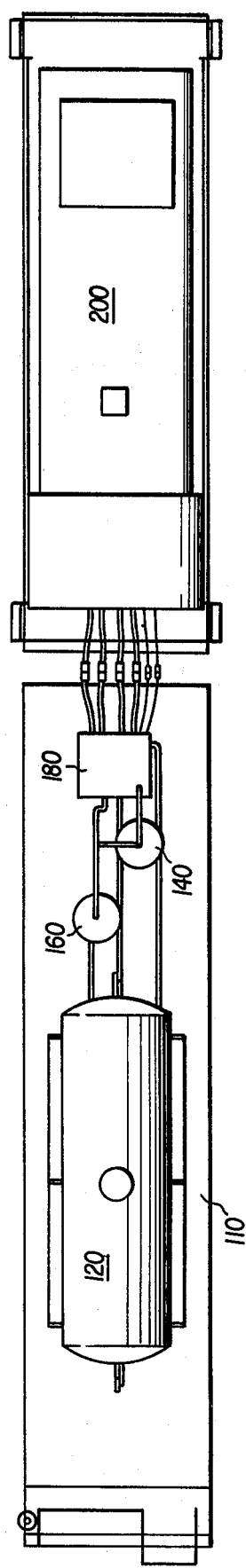
FIG. 1
FIG. 2

LOCOMOTIVE ENERGY RECOVERY SYSTEM

BACKGROUND OF THE INVENTION

The invention disclosed herein pertains generally to energy recovery systems, and more particularly to an energy recovery system for a diesel electric locomotive.

Locomotives used in present day railway systems often generate a great deal of heat energy which is not put to practical use. In some instances special accommodations are provided to vent the generated heat to the atmosphere. For example, the electricity generated during dynamic braking of a diesel electric locomotive is generally passed through resistors and the heat generated by these resistors is vented to the atmosphere through the roof of the locomotive. Furthermore, the waste heat generated during the operation of the diesel engine of a diesel electric locomotive, including the waste heat carried off by the hot exhaust gases emitted by the diesel engine, is dissipated to the atmosphere.

Heretofore, no energy recovery system has been available for capturing and storing the waste heat energy generated during the operation of a diesel electric locomotive, for use at a remote location and at a later time.

Accordingly, a primary object of the present invention is to capture and store the waste heat energy generated by a diesel electric locomotive for use at a remote location at a later time.

Another object of the present invention is to convert the electricity generated during dynamic braking of a diesel electric locomotive into heat, and to capture and store this heat for use at a remote location at a later time.

Yet another object of the present invention is to capture and store the waste heat generated during the operation of the diesel engine of a diesel electric locomotive for use at a remote location at a later time.

SUMMARY OF THE INVENTION

An energy recovery system for a locomotive mounted on wheels, according to the present invention, includes an internal combustion engine which serves as the primary source of power for the locomotive. An electric dynamo which is mechanically powered by the internal combustion engine electrically powers an electric motor. The electric motor serves to propel the locomotive by rotating at least one of the wheels of the locomotive, and operates as an electric dynamo to produce electricity during dynamic braking of the locomotive. The present invention also includes energy recovery means for capturing and storing waste heat energy generated by the internal combustion engine and the electrical energy generated by the electric motor.

BRIEF DESCRIPTION OF THE DRAWINGS

The present invention is described with reference to the accompanying drawings wherein like numerals denote like members and wherein:

FIG. 1 is a side view of a preferred embodiment of an energy recovery system for a diesel electric locomotive, according to the present invention;

FIG. 2 is a top view of the preferred embodiment depicted in FIG. 1; and

DETAILED DESCRIPTION OF THE PREFERRED EMBODIMENT

Figure 3A:
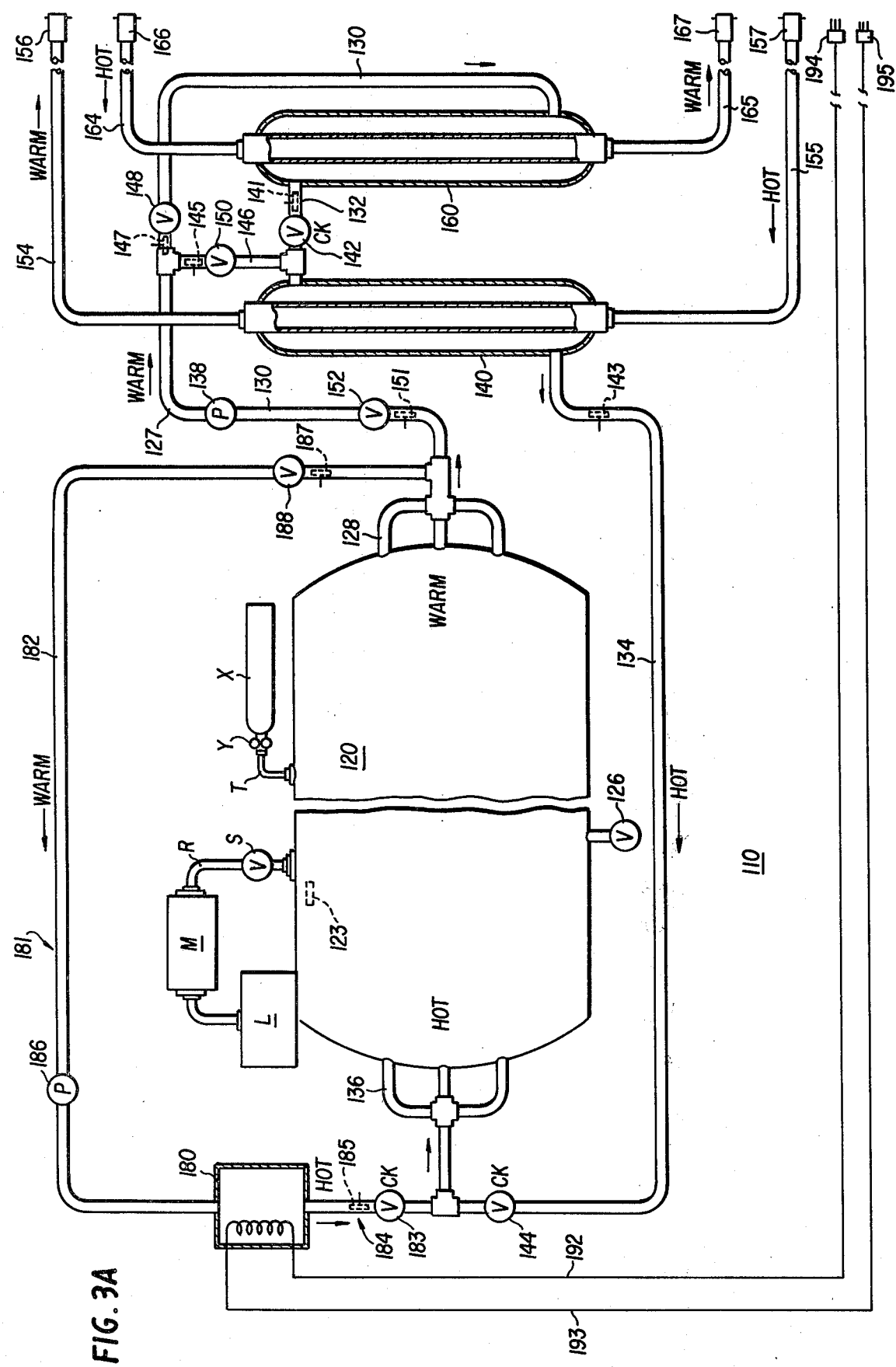
FIGS. 3A and 3B represent a schematic diagram of the preferred embodiment depicted in FIGS. 1 and 2.

With reference to FIGS. 1 and 2, a preferred embodiment of an energy recovery system 100 for a diesel electric locomotive, according to the present invention, includes a flatbed railway car 110 which is mechanically coupled to a diesel electric locomotive 200 mounted on a plurality of conventional wheels 202. The diesel electric locomotive, as described more fully below, includes a diesel engine which mechanically powers an alternator which supplies electricity to an electric motor which turns at least one of the wheels 202 of the locomotive. Mounted on the railway car 110 is a storage tank 120 which contains a heat storage fluid 122 which may, for example, be an aliphatic petroleum based oil marketed by the Exxon Corporation under the trademark Caloria HT-43. The purpose of the heat storage fluid 122 is to store the waste heat generated by the diesel electric locomotive 200, which waste heat is captured by the energy recovery system 100 of the present invention. The stored waste heat can then be used as a source of energy at a remote location at a later time.

The thermally insulated storage tank 120 which contains the heat storage fluid 122 may, for example, be of double wall construction.

Provided on top of the tank 120 (see FIG. 3a) is a conventional cylinder of compressed nitrogen gas X. The cylinder X is equipped with a regulating valve Y, which is adjusted to operate at one and one-quarter atmospheres or approximately 18.25 pounds per square inch. From the regulating valve Y a pipe T is connected to the top of the tank 120, which allows the flow of pressurized nitrogen gas to flow into the top of the tank 120 from the cylinder X as the heat storage fluid 122 is emptied therefrom.

Provided on top of the tank 120 is a pressure relief valve S, which is adjusted to operate at one and a half atmospheres or approximately 21.9 pounds per square inch. The pressure relief valve S is connected by means of a pipe R to the inlet of an air-cooled heat exchanger M. The pressure relief valve S allows the release of a mixture of nitrogen gas and petroleum vapors from the tank 120. This mixture of gas and vapor flows through pipe R to the air-cooled heat exchanger M. The gas and vapor are cooled inside the heat exchanger M. The cooled nitrogen gas is then allowed to escape to the atmosphere through the outlet, and the petroleum vapors are condensed into liquid form and allowed to drain into the outlet of the heat exchanger M and into the container L to be recycled at a later time. Valved flow lines 126 are provided at the base of tank 120 to facilitate filling and emptying of tank 120.

The use of regulated valve Y prevents the seepage of oxygenated air into tank 120, thus avoiding the ignition of heat storage fluid 122. The use of relief valve S and heat exchanger M allows the recovery of hot petroleum vapors which must be exhausted from tank 120, thus avoiding buildup inside tank 120.

Mounted on the railway car 110, adjacent the tank 120, is a first heat exchanger 140. The heat exchanger 140 is in fluid communication with the storage tank 120 as well as with the locomotive 200, and is used to transfer waste heat from the exhaust system of the locomotive's diesel engine to the heat storage fluid 122. The heat exchanger 140 may, for example, be a tube and shell heat exchanger and is hereinafter referred to as the exhaust transfer tube and shell heat exchanger.

A second heat exchanger 160 is also mounted on the railway car 110, in close proximity to the exhaust transfer tube and shell heat exchanger 140. The second heat exchanger 160 is in fluid communication with the storage tank 120 and with the locomotive 200, and is used to transfer waste heat from the cooling system of the locomotive's diesel engine to the heat storage fluid 122. The second heat exchanger 160 may, for example, be a tube and shell heat exchanger and is hereinafter referred to as the cooling jacket fluid tube and shell heat exchanger.

A third heat exchanger 180 is also mounted on the railway car 110, just forward of the exhaust transfer tube and shell heat exchanger 140. The third heat exchanger 180 is in fluid communication with the storage tank 120 and in electrical communication with the locomotive 200. The third heat exchanger includes apparatus for converting the electricity generated by the diesel electric locomotive 200 during dynamic braking into heat, and is used to transfer this heat to the heat storage fluid 122.

Figure 3B:
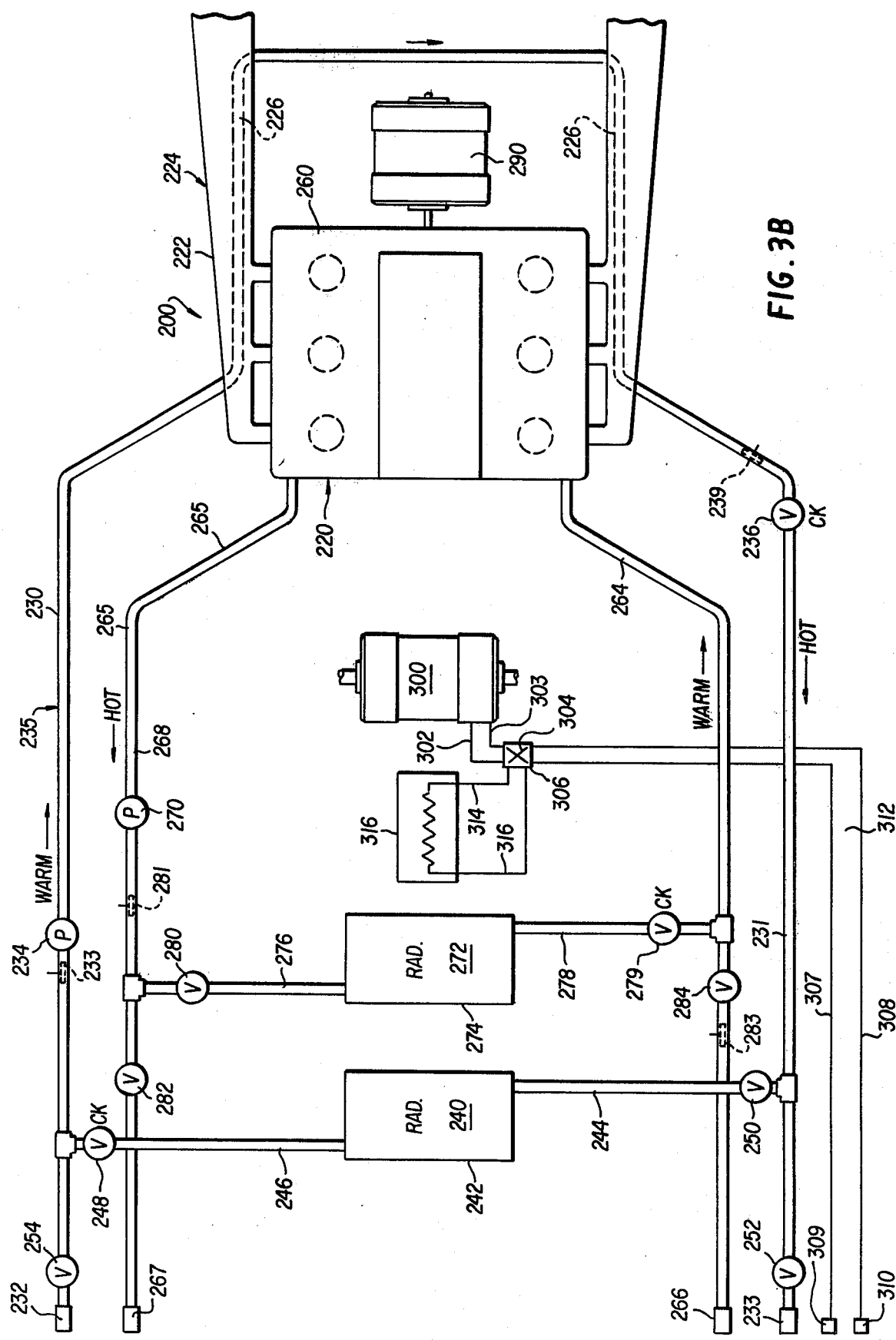

With reference to FIG. 3, the storage tank 120, the cooling jacket fluid tube and shell heat exchanger 160, and the exhaust transfer tube and shell heat exchanger 140 are serially arranged within a first flow circuit 127 through which the heat storage fluid 122 flows. The flow circuit 127 includes an outflow manifold 128 which is connected to the storage tank 120, and a conduit 130. One end of the conduit 130 is connected to the outflow manifold 128, while the opposite end of the conduit 130 is connected to the cooling jacket fluid tube and shell heat exchanger 160. The flow circuit also includes a conduit 132, the opposite ends of which conduit are respectively connected to the cooling jacket fluid tube and shell heat exchanger 160 and the exhaust transfer tube and shell heat exchanger 140. In addition, the flow circuit includes a conduit 134 which interconnects the heat exchanger 140 and the storage tank 120 via an inflow manifold 136 of the storage tank 120.

The heat storage fluid 122 in the storage tank 120 is pumped through the flow circuit 127 by a pump 138 which is in fluid communication with the conduit 130. That is, the pump 138 urges the heat storage fluid 122 to flow out of the storage tank 120 and through the outflow manifold 128, the conduit 130, the heat exchanger 160, the conduit 132, the heat exchanger 140, the conduit 134, the inflow manifold 136, and back into the storage tank 120. A one-way flow valve 142 is provided in the conduit 132 to prevent backflow from the heat exchanger 140 to the heat exchanger 160, while a one-way flow valve 144 is provided in the conduit 134 to prevent backflow from the storage tank 120 to the heat exchanger 140. The pump 138 may, for example, be electrically powered by the alternator of the locomotive 200 while the one-way valves 142 and 144 may, for example, be check valves.

Heat storage fluid 122 flowing through the conduit 130 from the storage tank 120 to the heat exchanger 160 may be short-circuited or diverted from the heat exchanger 160 directly to the heat exchanger 140 through a conduit 146 which interconnects the conduits 130 and 132. A valve 148 is provided in the conduit 130 downstream from the juncture of the conduits 130 and 146, and a valve 150 is provided in the conduit 146. When the valve 148 is closed and the valve 150 is open, heat storage fluid is diverted from the heat exchanger 160 and flows directly to the heat exchanger 140 through the conduit 146. On the other hand, when the valve 148 is open and the valve 150 is closed, the heat storage fluid 122 flows directly to the heat exchanger 160. A valve 152 is also provided in the conduit 130. When the valve 152 is closed all flow to the heat exchangers 160 and 140 is blocked. The valves 148, 150 and 152 may, for example, be gate valves actuated by electric motors electrically powered by the alternator of the locomotive 200.

In addition to having valves, the flow circuit 127 also includes temperature sensors which sense the temperature of the heat storage fluid 122. That is, a temperature sensor 151 is provided in the conduit 130 just upstream from the valve 152, and a temperature sensor 147 is provided in the conduit 130 just upstream from the valve 148. Also, a temperature sensor 141 is provided in the conduit 132 upstream from the one-way valve 142, and a temperature sensor 143 is provided in the conduit 134 upstream from the one-way valve 144. A temperature sensor 145 is also provided in the conduit 146 just upstream from the valve 150. Finally, a temperature sensor 123 is provided in the storage tank 120. The various temperature sensors may, for example, be electrically operated temperature sensing elements supplied with electricity by the alternator of the locomotive 200.

The electrically operated temperature sensing elements described above may, for example, be electrically wired to temperature display gauges mounted on a control panel (not shown). In addition, the electric motors which open and close the gate valves described above may also be wired to manually activate switches on the control panel, which switches may be used to activate the electric motors to open or to close the gate valves.

Conduits 154 and 155 are connected to, and extend from, opposite ends of the heat exchanger 140. The free end of the conduit 154 includes a fluid coupling 156, while the free end of the conduit 155 includes a fluid coupling 157. When the fluid couplings 156 and 157 are connected to corresponding fluid couplings on the locomotive 200, a fluid circuit is established between the heat exchanger 140 and the exhaust system of the locomotive's diesel engine. This fluid circuit enables a heat transfer fluid in heat exchange relation with the diesel engine's exhaust gases to flow into the heat exchanger 140 into heat exchange relation with the heat storage fluid 122. Thus, a waste heat in the exhaust gases emitted by the diesel engine of the locomotive 200 may be transferred to the heat storage fluid 122.

Conduits 164 and 165 are connected to, and extend from, opposite ends of the heat exchanger 160. The free end of the conduit 164 includes a fluid coupling 166, while the free end of the conduit 165 includes a fluid coupling 167. When the fluid couplings 166 and 167 are connected to corresponding fluid couplings on the locomotive 200, a fluid circuit is established between the heat exchanger 160 and the cooling system of the locomotive's diesel engine. This fluid circuit enables a cooling fluid in heat exchange relation with the locomotive's diesel engine to flow into the heat exchanger 160 into heat exchange relation with the heat storage fluid 122. Thus, a waste heat emitted by the diesel engine and absorbed by the cooling fluid may be transferred to the heat storage fluid 122.

The storage tank 120 and the heat exchanger 180 are serially arranged within a second flow circuit 181, separate and distinct from the first flow circuit 127. The flow circuit 181 includes a conduit 182 which interconnects the outflow manifold 128 of the storage tank 120 and the heat exchanger 180. The flow circuit 181 also includes a conduit 184 which interconnects the heat exchanger 180 with the inflow manifold 136 of the storage tank 120.

The heat storage fluid 122 in the storage tank 120 is pumped through the flow circuit 181 by a pump 186 in fluid communication with the conduit 182. That is, the pump 186 urges the heat storage fluid 122 to flow out of the storage tank 120 and through the outflow manifold 128, the conduit 182, the heat exchanger 180, the conduit 184, the inflow manifold 136, and back into the storage tank 120. A one-way flow valve 183 is provided in the conduit 184 to prevent backflow from the storage tank 120 to the heat exchanger 180. The pump 186 may, for example, be electrically powered by the alternator of the locomotive 200 while the one-way flow valve 183 may, for example, be a check valve.

A valve 188 is provided in the conduit 182. When the valve 188 is closed, the flow of heat storage fluid 122 from the storage tank 120 to the heat exchanger 180 is blocked. The valve 188, may for example, be a gate valve actuated by an electric motor powered by the alternator of the locomotive 200.

An electric resistor 190 is arranged within the heat exchanger 180. Electrical wires 192 and 193 are connected to, and extend from, opposite ends of the resistor 190, the wires 192 and 193 projecting out to the exterior of the heat exchanger 180. Electrical coupling connections 194 and 195 are connected, respectively, to the free ends of the wires 192 and 193. When the electrical coupling connections 194 and 195 are connected to corresponding electrical coupling connections on the locomotive 200, a closed electrical circuit is established, which circuit includes an electric motor of the diesel electric locomotive 200, which electric motor serves to propel the locomotive by turning at least one of the wheels of the locomotive. When the diesel electric locomotive undergoes dynamic braking, the electric motor operates like an electric dynamo or electrical generator to produce electricity which is transmitted to the resistor 190 via the wires 192 and 193. The resistor 190 converts this electricity into heat which is transferred to the heat storage fluid 122 in the heat exchanger 180.

As with the flow circuit 127, the flow circuit 181 also includes temperature sensors which sense the temperature of the heat storage fluid 122. That is, a temperature sensor 187 is provided in the conduit 182 just upstream from the valve 188, and a temperature sensor 185 is provided in the conduit 184 upstream from the one-way flow valve 183. The temperature sensors 185 and 187 may, for example, be electrically operated temperature sensing elements supplied with electricity by the alternator of the locomotive 200.

The electrically operated temperature sensing elements 185 and 187 may, for example, be electrically wired to temperature display gauges mounted on the abovementioned control panel. In addition, the electric motor which opens and closes the gate valve 188 may also be wired to a manually activated switch on the control panel, which switch may be used to activate the electric motor to open or close the gate valve.

With continued reference to FIG. 3, a diesel electric locomotive 200 adapted to conform to the energy recovery system 100 of the present invention includes a diesel engine 220 which constitutes the primary source of power for the locomotive. The diesel engine 220 mechanically powers an electric dynamo or alternator 290, which alternator supplies electric current to an electric motor 300. The electric motor 300 serves to rotate at least one of the wheels 202 of the locomotive, thereby propelling the locomotive.

The diesel engine 220 includes an exhaust system 222 having an exhaust gas manifold 224 through which the exhaust gases from the diesel engine 220 are conducted to the atmosphere. Arranged within the exhaust gas manifold 224 is a heat exchanger 226 which conducts a heat transfer fluid 228 into heat exchange relation with the exhaust gases from the diesel engine. The heat exchanger 226 is hereinafter referred to as the transfer fluid exhaust gas heat exchanger. The heat exchanger 226 may, for example, be a pipe manufactured from a material having a high thermal conductivity. The heat transfer fluid 228 may, for example, be a mixture of ethylene glycol and water.

Projecting outwardly in opposite directions from the exhaust gas manifold 224 are inflow and outflow conduits 230 and 231, each of which conduits is connected to one of the opposed ends of the heat exchanger 226. The free end of the inflow conduit 230 includes a fluid coupling 232 which may be connected to the fluid coupling 156 extending from the conduit 154 on the railway car 110, which conduit 154 is connected to the heat exchanger 140 mounted on the railway car 110. The free end of the outflow conduit 231 includes a fluid coupling 233 which may be connected to the fluid coupling 157 extending from the conduit 155 on the railway car 110, which conduit is also connected to the heat exchanger 140.

When the fluid coupling 232 is connected to the fluid coupling 156, and the fluid coupling 233 is connected to the fluid coupling 157, a closed fluid circuit 235 is established through which the heat transfer fluid 228 may flow. The closed fluid circuit 235 includes the inflow conduit 230, the exhaust gas transfer fluid heat exchanger 226, the outflow conduit 231, the conduit 155 leading to the heat exchanger 140 on the railway car 110, the heat exchanger 140, and the conduit 154 extending from the heat exchanger 140. A pump 234 is provided in fluid communication with the inflow conduit 230. In addition, a one-way flow valve 236 is arranged in the outflow conduit 231 to prevent backflow from the outflow conduit 231 to the heat exchanger 226. Thus, when the pump 234 is actuated, the heat transfer fluid 228 will flow through the inflow conduit 230 the heat exchanger 226 where the exhaust gases will transfer a waste heat they carry to the heat transfer fluid 228. Then the heat transfer fluid 228 will flow through the outflow conduit 231, through the conduit 155, and into the heat exchanger 140 where the heat transfer fluid will transfer the heat absorbed from the exhaust gases to the heat storage fluid 122. Finally, the heat transfer fluid 228 will flow through the conduit 154 back into the inflow conduit 230. The pump 234 may, for example, be electrically powered by the alternator 290, while the one-way flow valve 236 may, for example, be a check valve.

In the event that the temperature of the heat transfer fluid 228 is lower than the temperature of the heat storage fluid 122, no useful function would be served in conducting the heat transfer fluid 228 into heat exchange relation with the heat storage fluid 122 in the heat exchanger 140 on the railway car 110. Even in this event, however, the heat transfer fluid 228 must be cooled in order to protect the transfer fluid exhaust gas heat exchanger 226 from excessive heat buildup. Thus, a bypass 240 is provided for the heat transfer fluid 228, which bypass includes a conventional air-cooled radiator 242. The bypass 240 includes a conduit 244 which interconnects the outflow conduit 231 from the heat exchanger 226 and the radiator 242, and a conduit 246 which interconnects the radiator 242 and the inflow conduit 230 leading to the heat exchanger 226. A one-way flow valve 248 is provided in the conduit 246 to prevent backflow from the conduit 246 into the radiator 242. In addition, three other valves 250, 252 and 254 are provided to regulate the flow of heat transfer fluid 228 into the bypass 240. The valve 250 is provided in the conduit 244, while the valve 252 is provided in the outflow conduit 231 downstream from the interconnection between the outflow conduit 231 and the conduit 244. In addition, the valve 254 is provided in the inflow conduit 230, upstream from the interconnection between the inflow conduit 230 and the conduit 246. When the valve 250 is open and the valves 252 and 254 are closed, the heat transfer fluid 228 will flow through the inflow conduit 230, the heat exchanger 226, the outflow conduit 231, and the bypass 240. On the other hand, when the valve 250 is closed and the valves 252 and 254 are open, the heat transfer fluid 228 will flow through the fluid circuit 235 described above and will not flow through the bypass 240. The one-way valve 248 may, for example, be a check valve, while the valves 250, 252 and 254 may, for example, be gate valves actuated by electric motors powered by the alternator 290.

In order to sense the temperature of the heat transfer fluid 228, temperature sensors are provided in the conduits 230 and 231. That is, a temperature sensor 233 is provided in the conduit 230 just upstream from the pump 234, and a temperature sensor 239 is provided in the conduit 231 just upstream from the one-way flow valve 236. The temperature sensors 233 and 239 may, for example, be electrically operated temperature sensing elements supplied with electricity by the alternator 290.

The electricity operated temperature sensing elements 233 and 239 may, for example, be electrically wired to temperature display gauges mounted on the control panel described above. In addition, the electric motors which open and close the gate valves 250, 252 and 254 may also be wired to manually actuated switches on the control panel, which switches may be used to activate the electric motors to open or close the gate valves.

The diesel engine 220 also includes a cooling jacket 260 which encircles the engine block of the diesel engine. The cooling jacket 260 conducts a cooling fluid 262 in heat exchange relation with the engine block, the cooling fluid 262 cooling the engine block by absorbing waste heat emanating from the engine block. An inflow conduit 264 is connected to an inflow port on one end of the cooling jacket 260, while an outflow conduit 265 is connected to an outflow port on the opposite end of the cooling jacket 260. The free end of the inflow conduit 264 includes a fluid coupling 266 which may be connected to the fluid coupling 167 extending from the conduit 165 on the railway car 110, which conduit 165 is connected to the heat exchanger 160 mounted on the railway car 110. The free end of the outflow conduit 265 includes a fluid coupling 267 which may be connected to the fluid coupling 166 extending from the conduit 164 on the railway car 110, which conduit 164 is also connected to the heat exchanger 160.

When the fluid coupling 266 is connected to the fluid coupling 167, and the fluid coupling 267 is connected to the fluid coupling 166, a closed fluid circuit 268 is established through which the cooling fluid 262 may flow. The fluid circuit 268 includes the inflow conduit 264, the cooling jacket 260, the outflow conduit 265, the conduit 164 leading to the heat exchanger 160, the heat exchanger 160, and the conduit 165 extending from the heat exchanger 160. A pump 270 is provided in fluid communication with the outflow conduit 265. Thus, when the pump 270 is actuated, the cooling fluid 262 will flow through the inflow conduit 264 into the cooling jacket 260 where the cooling fluid will absorb a waste heat emanating from the engine block of the diesel engine 220. The cooling fluid 262 will then flow through the outflow conduit 265, through the conduit 164, and into the heat exchanger 160 where the cooling fluid 262 will transfer the heat absorbed from the engine block to the heat storage fluid 122. Finally, the cooling fluid 262 will flow through the conduit 165 back into the inflow conduit 264.

In the event that the temperature of the cooling fluid 262 is less than that of the heat storage fluid 122, the cooling fluid 262 is not pumped into heat exchange relation with the heat storage fluid 122 in the heat exchanger 160. Rather, the cooling fluid 262 is pumped through a bypass 272 which includes a conventional air-cooled radiator 274. The bypass 272 includes a conduit 276 which interconnects the outflow conduit 265 and the radiator 274, and a conduit 278 which interconnects the radiator 274 and the inflow conduit 264. A one-way flow valve 279 is provided in the conduit 278 to prevent backflow from the conduit 278 into the radiator 274. In addition, three other valves 280, 282 and 284 are provided to regulate the flow of cooling fluid 262 into the bypass 272. The valve 280 is provided in the conduit 276, while the valve 282 is provided in the outflow conduit 265, downstream from the interconnection between the conduits 265 and 276. The valve 284 is provided in the inflow conduit 264, upstream from the interconnection between the conduits 264 and 278. When the valve 280 is open and the valves 282 and 284 are closed, the cooling fluid 262 will flow through the inflow conduit 264, the cooling jacket 260, the outflow conduit 264, and the bypass 272. On the other hand, when the valve 280 is closed and the valves 282 and 284 are open, the cooling fluid 262 will flow through the fluid circuit 268 described above and will not flow through the bypass 272. The one-way valve 279 may, for example, be a check valve while the valves 280, 282 and 284 may, for example, be gate valves actuated by electric motors powered by the alternator 290.

In order to sense the temperature of the cooling fluid 262, temperature sensors are provided in the conduits 264 and 265. That is, a temperature sensor 283 is provided in the conduit 264 just upstream of the valve 284, and a temperature sensor 281 is provided in the conduit 265 downstream from the pump 270. The temperature sensors 281 and 283 may, for example, be electrically operated temperature sensing elements supplied with electricity by the alternator 290.

The electrically operated temperature sensing elements 281 and 283 may, for example, be electrically wired to temperature display gauges mounted on the control panel described above. In addition, the electric motors which open and close the gate valves 280, 282 and 284 may also be wired to manually actuated switches on the control panel, which switches may be used to activate the electric motors to open or close the gate valves.

During dynamic braking of the diesel electric locomotive 200, the electric motor 300 functions like an electric dynamo or electric generator to produce electricity. In order to capture and store the energy inherent in the electricity generated by the electric motor 300, the electric motor 300 is provided with electrical wires which can be used to transmit this electricity to the electrical resistor 190 provided in the heat exchanger 180 mounted on the railway car 110. That is, the electric motor 300 is provided with electric transmission wires 302 and 303 which may be connected by a switch 304 at a junction 306 to wires 307 and 308, respectively. Electrical coupling connections 309 and 310 are connected, respectively, to the free ends of the wires 307 and 308. When the electrical coupling connections 309 and 310 are connected to the corresponding electrical coupling connections 194 and 195 extending from the electrical wires 192 and 193 connected to the resistor 190 in the heat exchanger 180 mounted on the railway car 110, a closed electrical circuit 312 is established through which electricity from the electric motor 300 may flow. The electrical circuit 312 includes the electric motor 300, the wire 302, the wire 307, the wire 194, the electrical resistor 190, the wire 193, the wire 308, and wire 303. Thus, during dynamic braking of the locomotive 200, the electricity generated by the electric motor 300 will flow through the electrical circuit 312, and thus will flow through the electrical resistor 190 which will generate heat through ohmic heat. This heat will be transferred to the heat storage fluid 122 via heat exchange in the heat exchanger 180 on the railway car 110.

In the event that the electricity generated by the electric motor 300 is not to be transmitted to the resistor 190 in the heat exchanger 180 on the railway car 110, the switch 304 at the junction 306 may be turned or rotated so as to bring the wires 302 and 303 extending from the electric motor 300 into electrical contact with the wires 314 and 315. The electrical wires 314 and 315 are connected to opposite ends of an electrical resistor 316 arranged near a vent in the roof of the locomotive 200. Thus, the electricity generated by the electric motor 300 may be transmitted to the resistor 316 and the resulting heat vented to the atmosphere.

With reference once again to FIG. 3, during the operation of the present invention, with the diesel engine functioning and the fluid couplings 232, 233, 266 and 267 connected to the corresponding fluid couplings 156, 157, 166 and 167, the pump 138 will pump the heat storage fluid 122 from the storage tank 120 through the flow circuit 127 and into the heat exchangers 160 and 140 on the railway car 110. Simultaneously, the pump 270 will pump the cooling fluid 262 through the flow circuit 268 and into heat exchange relation with the heat storage fluid 122 in the heat exchanger 160, while the pump 234 pumps the heat transfer fluid 228 through the flow circuit 235 and into heat exchange relation with the heat storage fluid 122 in the heat exchanger 140. Thus, the waste heat emitted by the engine block of the diesel engine 220 and the waste heat carried by the exhaust gases emitted by the diesel engine 220 will be transferred to the heat storage fluid 122.

While the heat storage fluid 122, the cooling fluid 262, and the heat transfer fluid 228 are being pumped through their respective flow circuits, the temperatures of these fluids is sensed by the temperature sensors provided in the flow circuits. If the temperature of the heat storage fluid 122 comes to exceed that of the cooling fluid 262, then the heat storage fluid will be diverted from the heat exchanger 160 and directed via the conduit 146 to the heat exchanger 140. Simultaneously, of course, the cooling fluid 262 will be diverted from the heat exchanger 160 and directed to flow through the air-cooled radiator 274 in the bypass 272 where the cooling fluid can be cooled.

If the temperature of the heat storage fluid 122 comes to exceed that of the heat transfer fluid 228, then the flow of heat storage fluid to the heat exchangers 160 and 140 is halted by turning off the pump 138 and closing the valve 152. Simultaneously, of course, the heat transfer fluid is diverted from the heat exchanger 140 and directed to flow through the air-cooled radiator 242 in the bypass 240, where the heat transfer fluid can be cooled.

During a dynamic braking of the locomotive 200, and with the electrical couplings 309 and 310 connected to the corresponding electrical couplings 194 and 195, the electric motor 300 will generate electricity which will be transmitted to the electrical resistor 190 in the heat exchanger 180 on the railway car 110. Simultaneously, the pump 186 will pump the heat storage fluid 122 through the flow circuit 181 and into heat exchange relation with the resistor 190 in the heat exchanger 180. Thus, the electricity generated by the electric motor 300 will be converted to heat, and this heat will be transferred to the heat storage fluid 122.

In the event that the temperature of the heat storage fluid 122, as sensed by the temperature sensors in the flow circuit 181, comes to exceed the rated operating temperature of the resistor 190, the flow of heat storage fluid 122 to the heat exchanger 180 will be halted by turning off the pump 186 and closing the valve 188 in the conduit 182. Simultaneously, the switch 304 at the junction 306 will be rotated so that the electric transmission wires from the electric motor 300 are brought into electrical contact with the wires 314 and 315, which wires are connected to the electrical resistor 316 provided in a vent in the roof of the locomotive 200. Thus, the electricity generated by the electric motor 300 will be converted into heat by the resistor 316, which heat will be vented to the atmosphere.

At the completion of a run by the diesel electric locomotive 200 of the present invention, which is coupled to energy recovery system 100 of the present invention, the temperature of the heat storage fluid 122 in the storage tank 120 will have been raised from the ambient atmospheric temperature of a temperature which may be as high as 580° F. The relatively hot fluid 122 can then be used, for example, as a source of heat for heating the steam which is to be used to drive a steam turbine, which steam turbine is used to drive an electrical generator which produces electricity. The relatively hot fluid 122 can also be used, for example, for direct process heating.

The present invention is advantageous because the present invention captures and stores the waste heat energy generated by a diesel electric locomotive for use at a remote location and at a later time. That is, the present invention captures and stores the waste heat emitted by the engine block of the diesel engine of the diesel electric locomotive, and also captures and stores the waste heat carried by the exhaust gases emitted by the diesel engine.

The present invention is also advantageous because the present invention converts the electricity generated by the electric motor of a diesel electric locomotive into heat, and captures and stores this heat for use at a remote location and at a later time.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. An energy recovery system for a locomotive mounted on wheels, comprising:
    an internal combustion engine located on a wheeled locomotive which serves as the primary source of power for said locomotive;
    an electric dynamo which is mechanically powered by said internal combustion engine;
    an electric motor which is electrically powered by said dynamo, which electric motor serves to propel the locomotive by rotating at least one of the wheels of said locomotive, and which electric motor operates as a dynamo to produce electricity during dynamic braking of said locomotive; and
    energy recovery tank means containing a heat storage fluid for capturing and storing waste heat energy generated by said internal combustion engine and electrical energy generated by said electric motor for use at a remote location at a later time.

2. Apparatus in accordance with claim 1 wherein said internal combustion engine emits exhaust gases containing a waste heat; and
    said energy recovery means includes first heat exchange means for transferring said exhaust gas waste heat to said heat storage fluid.

3. Apparatus in accordance with claim 2 wherein said internal combustion engine includes a cooling fluid which absorbs a waste heat given off by said engine; and
    said energy recovery means includes second heat exchange means for transferring the waste heat absorbed by said cooling fluid to said heat storage fluid.

4. Apparatus in accordance with claim 1 wherein said energy recovery means includes:
    means for converting the electrical energy generated by said electric motor into heat; and
    third heat exchange means for transferring said heat to said heat storage fluid.

5. Apparatus in accordance with claim 2 wherein said first heat exchange means includes:
    a heat transfer fluid in heat exchange relation with said exhaust gases;
    a first heat exchanger;
    first flow means for communicating said heat transfer fluid to said first heat exchanger; and
    second flow means for communicating said heat storage fluid to said first heat exchanger and then to said tank, so that said heat storage fluid may be brought into heat exchange relation with said heat transfer fluid;
    said second flow means including a flow path between said tank and said first heat exchanger.

6. Apparatus in accordance with claim 5 wherein said second heat exchange means includes:
    a second heat exchanger provided in said flow path between said tank and said first heat exchanger; and
    third flow means for communicating said cooling fluid to said second heat exchanger;
    said second flow means communicating said second heat exchanger before communicating said heat storage fluid to said first heat exchanger, so that said heat storage fluid may be brought into heat exchange relation with said cooling fluid.

7. Apparatus in accordance with claim 6 wherein said first and second heat exchangers are mounted on a railroad car.

8. Apparatus in accordance with claim 4 wherein said third heat exchange means is mounted on a railroad car.

9. Apparatus in accordance with claim 1 wherein said internal combustion engine is a diesel engine.

* * * * *